(12) United States Patent
Avadanei et al.

(10) Patent No.: US 7,259,779 B2
(45) Date of Patent: Aug. 21, 2007

(54) AUTOMATIC ASSESSMENT OF DE-INTERLACED VIDEO QUALITY

(75) Inventors: Dragos C Avadanei, Kirkland, WA (US); Stephen C Rowe, Bellevue, WA (US); Stephen J Estrop, Carnation, WA (US); Gary J Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 580 days.

(21) Appl. No.: 10/917,708

(22) Filed: Aug. 13, 2004

(65) Prior Publication Data

US 2006/0033814 A1 Feb. 16, 2006

(51) Int. Cl.
*H04N 17/00* (2006.01)
(52) U.S. Cl. ..................... 348/193; 348/180
(58) Field of Classification Search ............... 348/180, 348/189, 193, 448; 702/1, 81, 84, 108, 127; *H04N 17/00, H04N 17/02*
See application file for complete search history.

(56) References Cited

U.S. PATENT DOCUMENTS 6,459,454 B1 * 10/2002 Walters ................. 348/448
6,493,023 B1 * 12/2002 Watson ................. 348/180
6,657,677 B1 * 12/2003 He et al. ............... 348/625

* cited by examiner

*Primary Examiner*—Sherrie Hsia

(57) ABSTRACT

Assessment of de-interlaced video quality is determined automatically by de-interlacing interlaced video content using a reference de-interlacer and a test de-interlacer. The reference de-interlacer produces a result of known quality and the test de-interlacer is one which is being assessed. The result from each de-interlacer is compared to reference video content to derive a signal-to-noise ratio for each relative to the reference video content. The difference in the signal-to-noise ratios is compared against a predefined threshold. If the difference is within the range defined by the threshold, the test de-interlacer is determined to produce an acceptable product.

25 Claims, 4 Drawing Sheets

AUTOMATIC ASSESSMENT OF DE-INTERLACED VIDEO QUALITY

TECHNICAL FIELD

The following description relates generally to video content processing and, more specifically, to quality evaluation of de-interlaced video content.

BACKGROUND

As the role of the personal computer (PC) becomes more prominent in the multimedia space, PC-based applications will potentially substitute consumer grade dedicated components, such as DVD players, television tuners and video processors. Video content is commonly available in an interlaced format. In systems that utilize a non-interlaced video display device, interlaced video content is de-interlaced before it is displayed. De-interlacing is a process that attempts to synthesize data that is missing from an interlaced representation. The quality of de-interlaced video content is directly related to the quality of the means by which interlaced video content is de-interlaced. Evaluation of de-interlaced content has historically been subjective in nature, i.e. video quality is judged by the human eye. This makes it burdensome and difficult to assess relative quality of de-interlaced content produced by several unique de-interlacing methods.

SUMMARY

The following presents a simplified summary of the disclosure to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The following description relates to automatically assessing de-interlaced video content with a minimum of subjectivity. Quality of de-interlaced video content derived from a test de-interlacer is objectively compared against de-interlaced video content derived from a reference de-interlacer. The quality of each is determined by a signal-to-noise ratio (SNR) with regard to preliminarily filtered source content. A difference between the ratios is compared to a subjectively determined threshold. De-interlacers that produce de-interlaced video content that meets the threshold difference requirement are considered to evaluate positively.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following narrative describes one or more implementations for automatically assessing quality of de-interlaced video content. While one or more specific implementations may be illustrated and described below, it will be appreciated that the described implementations are merely exemplary and that various changes may be made therein without departing from the spirit and scope of the subject matter described herein.

Exemplary Sequence Diagram: De-Interlaced Video Assessment

Figure 1:
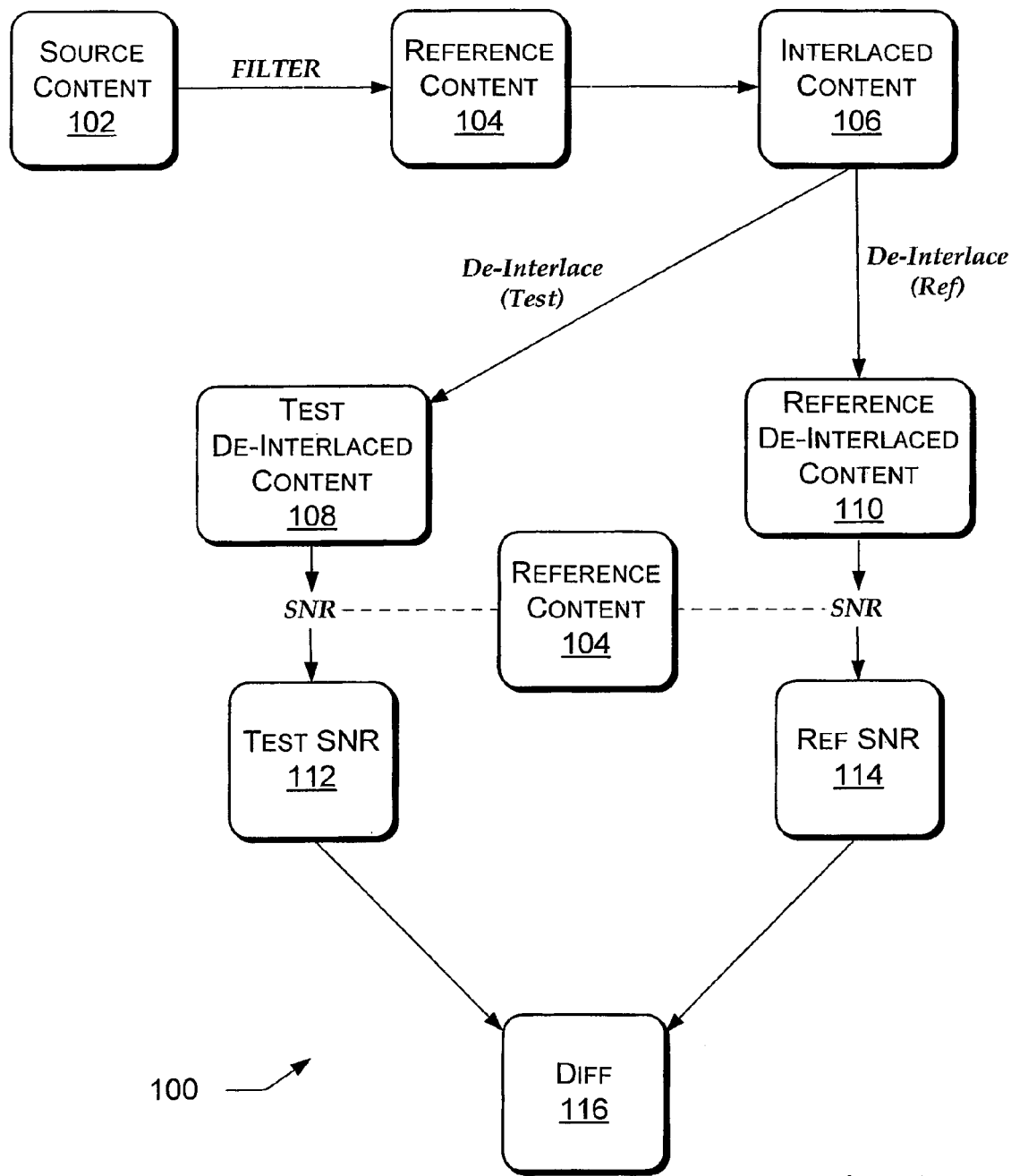
FIG. 1 is a sequence diagram generally describing steps in a de-interlaced video assessment process.

FIG. 1 is a sequence diagram 100 generally describing steps in a de-interlaced video assessment process. The sequence diagram 100 is meant to give an overview of certain steps that occur in the assessment process. The steps are outlined in greater detail below, with reference to subsequent figures.

Certain concepts regarding video signal processing are used in the discussion below. Some of those concepts are summarized herein. A frame consists of two fields. Typically, these fields comprise an even field and an odd field, where the even field is comprised of even-numbered lines of the frame and the odd field is comprised of odd-numbered lines of the frame. The property of a field that distinguishes whether it contains the even lines or the odd lines is referred to as the field parity.

Progressive scan video consists of a sequence of frames in which both fields of each frame are captured at the same time. Interlaced video content consists of a sequence of frames in which the two fields of each frame are not captured at the same time. An alternative way of describing interlaced content is as a sequence of fields of alternating parity.

In the following description "simulated interlaced content" is used. "Simulated interlaced content" can be created by discarding one field from each frame of source progressive content. For example, the even field from a first frame can be discarded and an odd field from a second frame can be discarded, etc. to produce a sequence of fields of alternating parity. Equivalently, this produces an interlaced source having half the frame rate (measured in frames per second) as the frame rate of the original progressive scan source video.

Source content 102 is filtered to produce reference content 104 which is then used in an interlacing process to produce interlaced content 106. In one implementation, a frame of progressive content may be filtered according to a line-averaging method so that each resulting line is an average of the lines above and below a corresponding line in the source content. For example, a line 0 of reference content 104 may be produced by averaging a line 0 and a line 1 from source content 102. A line 1 of reference content 104 may be produced by averaging a line 1 and a line 2 from source content 102. A line 2 of reference content 104 may be produced by averaging a line 2 and a line 3 from source content 102, and so on. A last line of reference content 104 may simply be a last line of the source content 102.

Notwithstanding the foregoing, reference filtering is not required. In at least one implementation, the source content 102 is not filtered before subsequent processing. However, filtering may be used as described below.

The interlaced content 106 is then de-interlaced with a test de-interlacer to produce test de-interlaced content 108. The interlaced content 106 is also de-interlaced with a reference de-interlacer to produce reference de-interlaced content 110.

An error measurement (such as a signal-to-noise ratio (SNR)) is taken between the test de-interlaced content 108 and the reference content 104 (Test SNR 112). A similar error measurement is also taken between the reference de-interlaced content 108 and the reference content 104 (Reference SNR 114). The test SNR 112 and the reference SNR 116 are compared and the difference 116 is derived (or another appropriate comparison method).

As will be described in greater detail below, the difference 116 may then be compared against a threshold to determine if the test de-interlacer produces de-interlaced content of an acceptable quality.

Subjective evaluations are initially made to derive an appropriate threshold. However, once the threshold is determined, the process may thereafter be automated and an objective measurement taken with regard to the threshold to determine whether the product of a particular test de-interlacer is of an acceptable quality. Such a process relieves the burden of subjectively qualifying each test de-interlacer that is to be evaluated.

Exemplary De-Interlaced Video Content Assessment System

Figure 2:
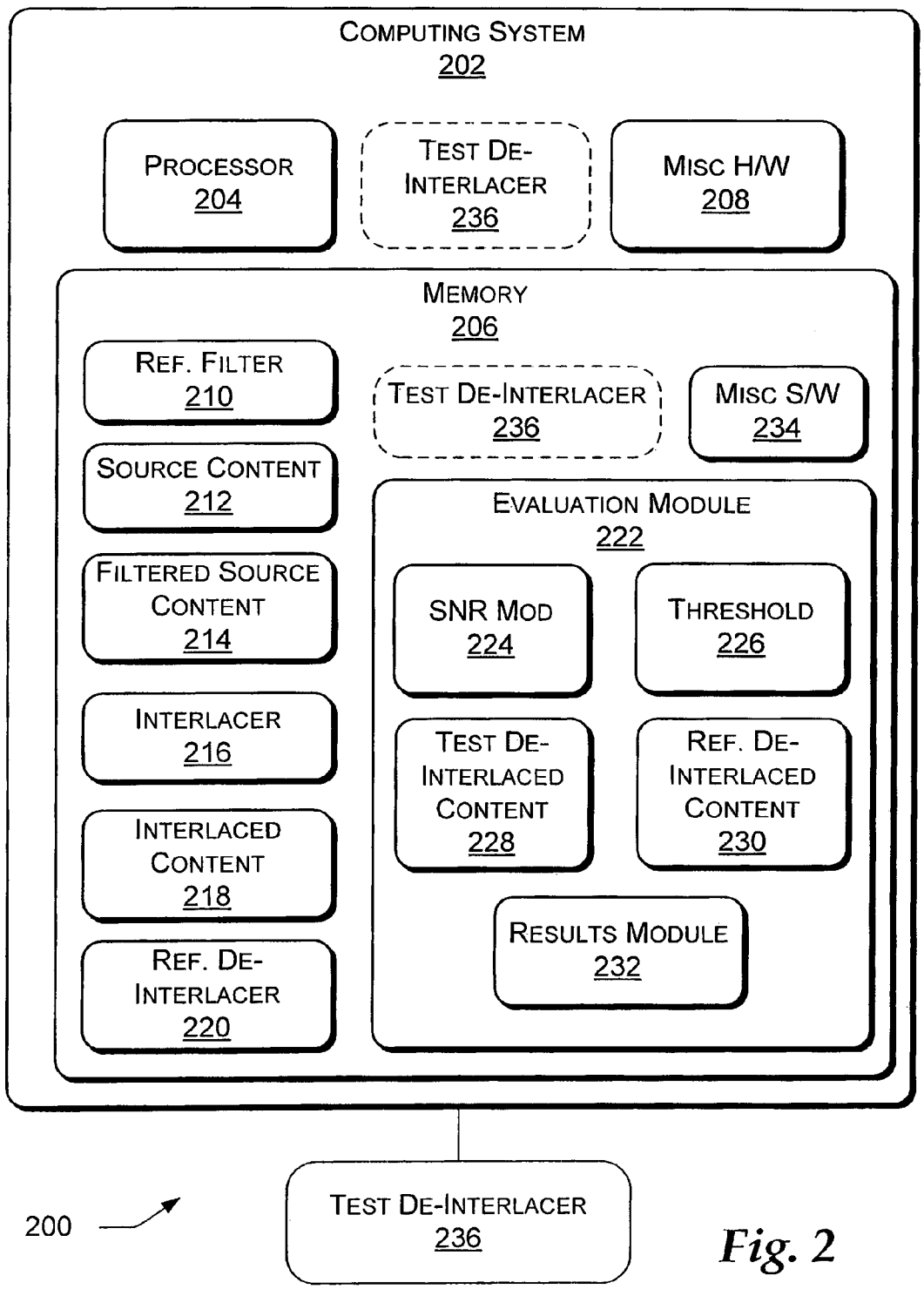
FIG. 2 is a block diagram of an exemplary de-interlaced video content assessment system in accordance with the description contained herein.
Figure 4:
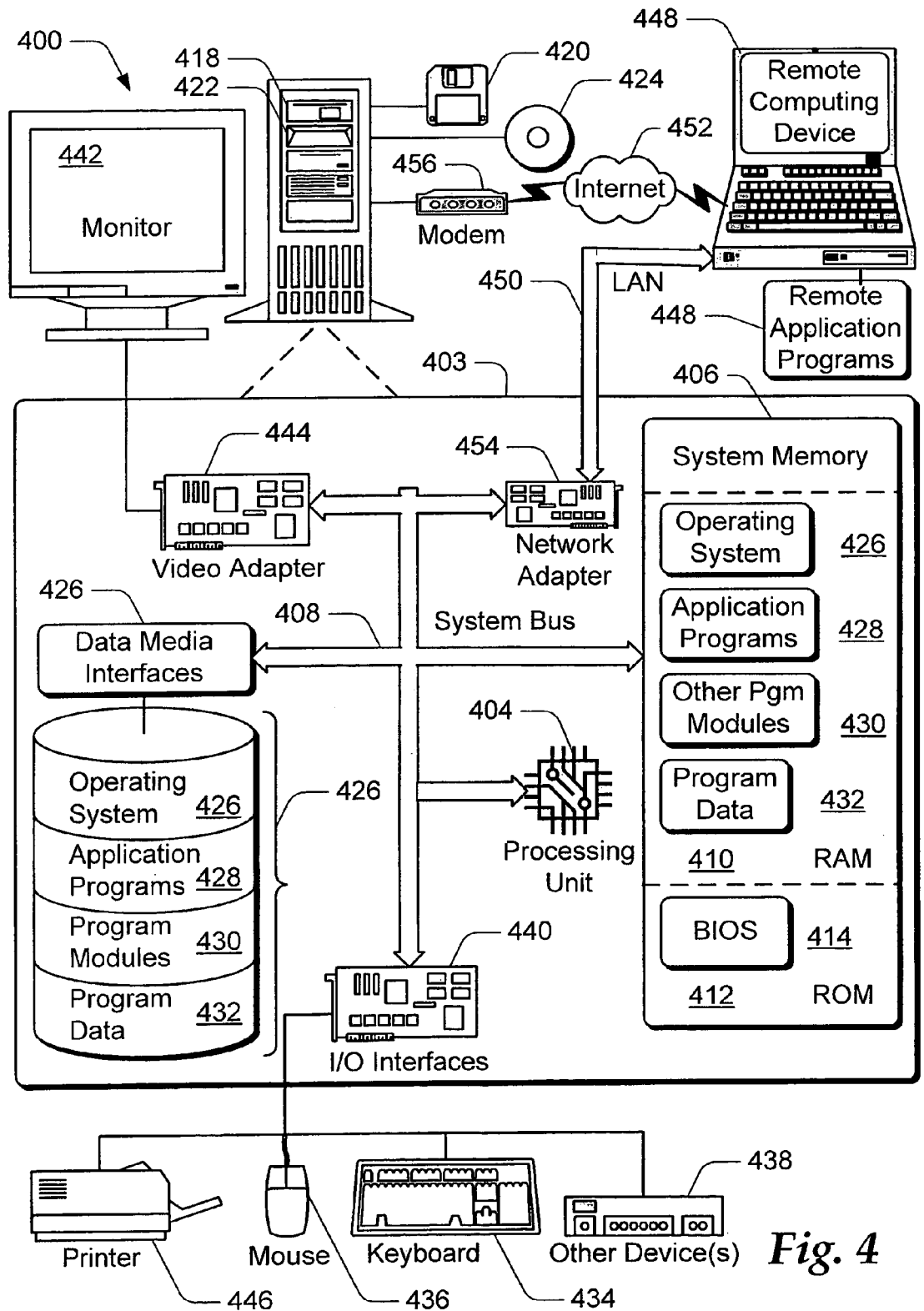
FIG. 4 is a block diagram of an exemplary computing system environment.

FIG. 2 is a block diagram of an exemplary de-interlaced video content assessment system 200 in accordance with the description contained herein. A more detailed description of one or more of the components shown in FIG. 2 are shown in FIG. 4, below, and described in the description associated therewith. In the block diagram presented, system components are shown in functional blocks which are named accordingly. The following description of the block diagram describes the components according to functions attributed to the components.

However, it is noted that one or more particular functions herein attributed to a particular component may be performed exclusively by the component, by the component in conjunction with one or more other components, or exclusively by one or more other components without departing from the scope of the claims appended hereto. It is also noted that components shown as hardware components may also be practiced in software components, and that components shown as software components may also be practiced in hardware. Specific functionality attributed to particular components and allocation of tasks to one or more components is merely exemplary and is made herein for description purposes only and not by way of limitation.

It is noted that a representative system may include all, some or more components than those shown in FIG. 2, depending on how much of the complete process is performed by the system. Any system capable of performing the functionality required by the appended claims is a representative system of the automatic assessment of de-interlaced video quality.

The system 200 includes a computing system 202, a processor 204 and memory 206. Other miscellaneous hardware 108 is included in the computing system 202 to perform functions collateral to the specific functionality otherwise shown and described herein, such as input/output (I/O) functionality and the like.

The memory 206 includes a reference filter 210, source content 212, filtered source content 214, and miscellaneous software 234 required for normal functionality of the computing system 102 (e.g., an operating system, etc.). The source content 212 is original non-interlaced progressive video content that is used as a basis for the assessment of one or more test de-interlacers. The reference filter 210 is a video content filter 210 that performs a simulated interlacing procedure (as described above) on the source content 212 to derive the filtered source content 214.

The memory 206 also includes an interlacer 216 that is representative of one of multiple video interlacing systems in practical operation that will be used to interlace the source content 212 in the assessment process. The particular nature of the reference filter 210 depends on the nature of the interlacer 216 in that a similar technique is used in each. The partial interlacing procedure performed by the reference filter 210 produces content that roughly simulates interlaced content. For example, line averaging may be applied to one frame of non-interlaced progressive content to produce a frame of filtered source content 214. As a result, the filtered source content 214 comprises one complete, non-interlaced frame that can later be compared to a similar de-interlaced frame.

The interlacer 216 interlaces the source content 212 to produce interlaced content 218. As will be discussed in greater detail below, the interlaced content 218 is used as a source for a reference de-interlacer 220 and a test de-interlacer 236. The reference de-interlacer is a de-interlacer that is known to produce de-interlaced video content of an acceptable quality.

The test de-interlacer 236 may be one of several de-interlacing devices that is being tested to determine if it produces de-interlaced video content of an acceptable quality. The test de-interlacer 236 is shown in FIG. 2 as a component—hardware or software—that is separate from the computing device 202, as a module stored in the memory 206 of the computing device 202, or as a hardware or software component of the computing device 202 that is not included in the memory 206 of the computing device. Any type of de-interlacer may be tested using the techniques described herein.

It is also noted that only a portion of the procedure described above may be used. For example, if many test de-interlacer products are to be compared to reference de-interlaced content, previously stored reference de-interlaced content may simply be accessed so that the filtered source content does not have to be de-interlaced multiple times by a reference de-interlacer. Or, in another example, instead of running the filtered source content through a test de-interlacer, previously processed test de-interlaced content may initially be used. In summary, any part of the processing described herein can be avoided by performing that processing and storing its results for later use.

The memory 206 also includes an evaluation module 222 that includes several sub-components. The evaluation module 222 includes a signal-to-noise ratio (SNR) module 224 that is configured to derive a SNR between multiple units of de-interlaced video content. The evaluation module 222 also includes a threshold 226, test de-interlaced content 228, reference de-interlaced content 230 and a result module 232.

It is noted that virtually any method of error measurement may be used in an implementation without departing from the scope of the appended claims. Some examples of error measurement techniques include, but are not limited to, signal-to-noise ratio (SNR), peak signal-to-noise ratio (PSNR), mean square error (MSE), sum of absolute differences (SAD), sum of squared errors (SSE), mean absolute difference (MAD), rth power distortion, etc. The type of threshold utilized and the type of comparison used will depend on the method of error measurement used. The present example is shown primarily using SNR and a difference comparison.

The SNR module 224 utilizes standard MSE (mean square error) methodology to derive signal-to-noise ratios. MSE and SNR computations are well known in the art and are, therefore, not described in detail here.

The threshold 226 is a predefined value that is determined from empirical testing and reflects a difference between a test SNR taken using the test de-interlaced video content 228 and the filtered source content 214, and a reference SNR taken using the reference de-interlaced video content 230 and the filtered source content 214.

The threshold may be expressed in one of several ways. For example, the threshold 226 may be an absolute value that, when exceeded by the difference between the test SNR and the reference SNR, indicates that the test de-interlacer does not produce de-interlaced content of an acceptable quality. Or, in another example, the threshold may be a value representing a percentage. If the test de-interlaced video content 228 is greater than or equal to the threshold percentage of the reference de-interlaced video content 230, then the quality of the test de-interlacer product is deemed acceptable.

In one or more other implementations, the use of a threshold may not be necessary. For example, a standard may be used wherein if test de-interlaced content contains less error than reference de-interlaced content, the test de-interlaced content is acceptable. In such a case, no threshold is used—only a strict comparison of error between test de-interlaced content and reference de-interlaced content. A threshold is shown and described here for example only.

In at least one other implementation, multiple thresholds may be utilized. For example, one may wish to designate three unique thresholds with which to compare test results. A gradation of acceptable quality may thus be determined. For example, meeting a first threshold but not a second may indicate that quality is "good," while meeting the second threshold but not the third indicates "better." Then, meeting all three threshold will indicate a quality of "best."

The components shown in FIG. 2 and described therefore will be discussed in greater detail in the discussion of FIG. 3, below.

Exemplary Methodological Implementation

Figure 3:
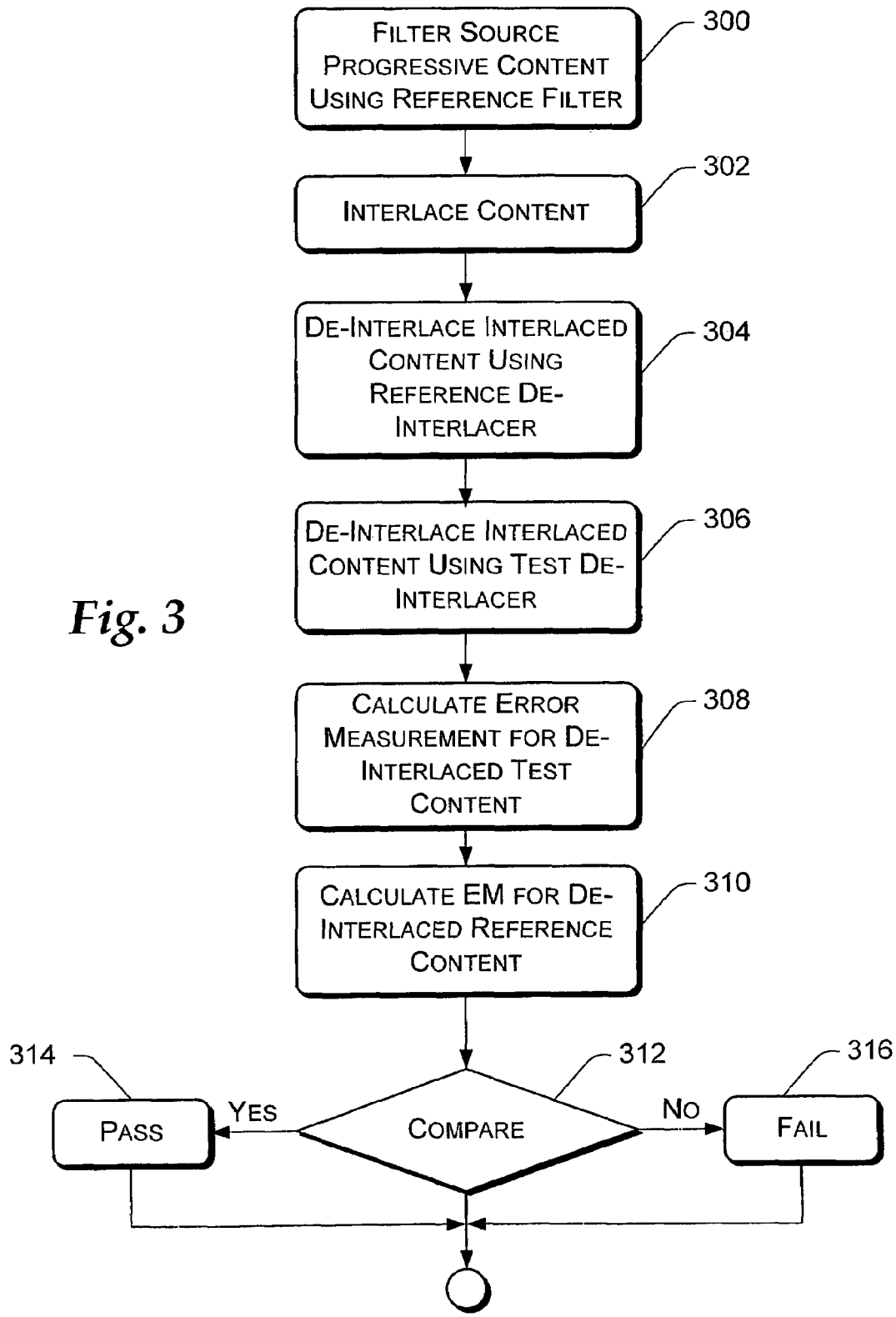
FIG. 3 is a flow diagram depicting an exemplary methodological implementation of automatically assessing quality of de-interlaced video content.

FIG. 3 is a flow diagram depicting an exemplary methodological implementation of a process for automatically assessing quality of de-interlaced video content. In the following discussion, continuing reference is made to the elements and reference numerals shown in one or more previous figures. It is noted that the steps shown in FIG. 3 comprise an overall view of a process for automatic assessment of de-interlaced video quality. One or more of the appended claims may be represented by only a portion of the steps shown.

At block 300, the source content 212 is filtered using the reference filter 210 to produce the filtered source content 214. As previously noted, the reference filter 210 processing is related to the interlacing process in that it simulates interlaced content 218. For example, if the interlacer 216 utilizes an "even fields first" algorithm for interlacing video content, the reference filter 210 also uses an "even fields first" algorithm.

In the interlacing process, two frames from subsequent frames of the progressive non-interlaced source content are used to produce a single frame of interlaced content. Since a goal of the techniques described herein is to compare non-interlaced video content with non-interlaced video content, the interlaced content cannot be used for the comparison. In theory, the de-interlaced content that results from de-interlacing the interlaced content could be compared with the original source content. However, such a comparison does not provide a fair and meaningful result so a quasi-interlaced non-interlaced frame (i.e. the filtered source content 214) is used.

In at least one implementation, a two-tap reference filter 210 having a value of {0.5, 0.5} is used to produce the filtered source content 214. The filtered source content is then interlaced at block 302 to produce the interlaced content 218. If, say, an even field from the progressive source content is taken, then the odd field for the filtered source content The interlaced content 218 is de-interlaced at block 304 using the reference de-interlacer 210. The reference de-interlacer 210 is a de-interlacer known to produce acceptable results. The interlaced content 218 is also de-interlaced (block 306) using the test de-interlacer 236.

At block 308, a signal-to-noise ratio is derived from the reference de-interlaced content 230 relative to the filtered source content 214. The reference de-interlaced content 230 and the filtered source content 214 are comparable because they both comprise non-interlaced content. At block 310, a signal-to-noise ratio is derived from the test de-interlaced content 228 relative to the filtered source content 214.

The difference between the SNR from the test de-interlaced content 228 and the SNR from the reference de-interlaced content 230 is compared to the threshold 226 at block 312. As previously noted, the threshold 226 can be expressed in one of several ways. If the SNR using the test de-interlaced content 228 is within limits defined by the threshold 226 ("Yes" branch, block 212, then the test de-interlacer 236 is deemed to be acceptable (block 214). If, however, the SNR using the test de-interlaced content 228 is not within the defined limits of acceptability ("No" branch, block 212), then the test de-interlacer 236 fails to meet the standard (block 316).

In at least one implementation, the threshold 226 is defined to be 0.95 (or 95%). In such an implementation, if the test SNR is greater than or equal to 95% of the reference SNR, then the test de-interlacer is acceptable.

In at least one other implementation, the threshold 226 is defined to be three (3) decibels. In such an implementation, if the difference between the reference SNR and the test SNR is less than or equal to three decibels, then the test de-interlacer is deemed to produce de-interlaced content that is of acceptable quality.

In yet another implementation, a threshold comparison is not utilized. Instead, if the test de-interlaced content contains an equal or lesser amount of error, then the test de-interlaced content is of an acceptable quality. However, in one sense, this is merely utilizing a threshold that is equal to zero.

These exemplary threshold values are subjective values derived from empirical testing. It is noted that other threshold values may be utilized depending on certain factors, such as for what type of application the video content is being used, the available computing environment, etc.

Exemplary Computing Environment

FIG. 4 illustrates an exemplary computing environment 400 within which user interface transition systems and methods, as well as the computing, network, and system architectures described herein, can be either fully or partially implemented. Exemplary computing environment 400 is only one example of a computing system and is not intended to suggest any limitation as to the scope of use or functionality of the architectures. Neither should the computing environment 400 be interpreted as having any dependency or requirement relating to any one or combination of components illustrated in the exemplary computing environment 400.

The computer and network architectures in computing environment 400 can be implemented with numerous other general purpose or special purpose computing system environments or configurations. Examples of well known computing systems, environments, and/or configurations that may be suitable for use include, but are not limited to, personal computers, server computers, client devices, handheld or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 400 includes a general-purpose computing system in the form of a computing device 402. The components of computing device 402 can include, but are not limited to, one or more processors 404 (e.g., any of microprocessors, controllers, and the like), a system memory 406, and a system bus 408 that couples the various system components. The one or more processors 404 process various computer executable instructions to control the operation of computing device 402 and to communicate with other electronic and computing devices. The system bus 408 represents any number of several types of bus structures, including a memory bus or memory controller, a peripheral bus, an accelerated graphics port, and a processor or local bus using any of a variety of bus architectures.

Computing environment 400 includes a variety of computer readable media which can be any media that is accessible by computing device 402 and includes both volatile and non-volatile media, removable and non-removable media. The system memory 406 includes computer-readable media in the form of volatile memory, such as random access memory (RAM) 410, and/or non-volatile memory, such as read only memory (ROM) 412. A basic input/output system (BIOS) 414 maintains the basic routines that facilitate information transfer between components within computing device 402, such as during start-up, and is stored in ROM 412. RAM 410 typically contains data and/or program modules that are immediately accessible to and/or presently operated on by one or more of the processors 404.

Computing device 402 may include other removable/non-removable, volatile/non-volatile computer storage media. By way of example, a hard disk drive 416 reads from and writes to a non-removable, non-volatile magnetic media (not shown), a magnetic disk drive 418 reads from and writes to a removable, non-volatile magnetic disk 420 (e.g., a "floppy disk"), and an optical disk drive 422 reads from and/or writes to a removable, non-volatile optical disk 424 such as a CD-ROM, digital versatile disk (DVD), or any other type of optical media. In this example, the hard disk drive 416, magnetic disk drive 418, and optical disk drive 422 are each connected to the system bus 408 by one or more data media interfaces 426. The disk drives and associated computer readable media provide non-volatile storage of computer readable instructions, data structures, program modules, and other data for computing device 402.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, application programs 428, other program modules 430, and program data 432 (or some combination thereof) may include an embodiment of the systems and methods described herein.

Computing device 402 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 402 via any number of different input devices such as a keyboard 434 and pointing device 436 (e.g., a "mouse"). Other input devices 438 (not shown specifically) may include a microphone, joystick, game pad, controller, satellite dish, serial port, scanner, and/or the like. These and other input devices are connected to the processors 404 via input/output interfaces 440 that are coupled to the system bus 408, but may be connected by other interface and bus structures, such as a parallel port, game port, and/or a universal serial bus (USB).

A monitor 442 or other type of display device can be connected to the system bus 408 via an interface, such as a video adapter 444. In addition to the monitor 442, other output peripheral devices can include components such as speakers (not shown) and a printer 446 which can be connected to computing device 402 via the input/output interfaces 440.

Computing device 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computing device 402.

Logical connections between computing device 402 and the remote computing device 448 are depicted as a local area network (LAN) 450 and a general wide area network (WAN) 452. Such networking environments are commonplace in offices, enterprise-wide computer networks, intranets, and the Internet. When implemented in a LAN networking environment, the computing device 402 is connected to a local network 450 via a network interface or adapter 454. When implemented in a WAN networking environment, the computing device 402 typically includes a modem 456 or other means for establishing communications over the wide area network 452. The modem 456, which can be internal or external to computing device 402, can be connected to the system bus 408 via the input/output interfaces 440 or other appropriate mechanisms. The illustrated network connections are exemplary and other means of establishing communication link(s) between the computing devices 402 and 448 can be utilized.

In a networked environment, such as that illustrated with computing environment 400, program modules depicted relative to the computing device 402, or portions thereof, may be stored in a remote memory storage device. By way of example, remote application programs 458 are maintained with a memory device of remote computing device 448. For purposes of illustration, application programs and other executable program components, such as the operating system 426, are illustrated herein as discrete blocks, although it is recognized that such programs and components reside at various times in different storage components of the computing device 402, and are executed by the processors 404 of the computing device.

While the preferred embodiment of the invention has been illustrated and described, it will be appreciated that various changes can be made therein without departing from the spirit and scope of the invention.

The invention claimed is:

1. A method, comprising:
   applying a reference filter to source video content to derive filtered source content;
   interlacing the source video content to derive interlaced content;
   de-interlacing the interlaced content with a test de-interlacer to derive test de-interlaced content;
   de-interlacing the interlaced content with a reference de-interlacer to derive reference de-interlaced content;
   deriving a test signal-to-noise ratio between the test de-interlaced content and the filtered source content;
   deriving a reference signal-to-noise ratio between the reference de-interlaced content and the filtered source content; and
   comparing the test signal-to-noise ratio and the reference signal-to-noise ratio with a predefined threshold to determine a level of quality of the test de-interlaced content.

2. The method as recited in claim 1, the reference filter including an interlacing step.

3. The method as recited in claim 2, the reference filter producing one interlaced frame and restoring missing data from the interlaced frame with corresponding original data from the source content.

4. The method as recited in claim 1, the comparing step further comprising:
   deriving a difference between the test signal-to-noise ratio and the reference signal-to-noise ratio; and
   comparing the difference to a threshold that is an absolute value.

5. The method as recited in claim 1, the comparing step further comprising:
   deriving a product from the threshold expressed as a percentage and the reference signal-to-noise ratio; and
   comparing the product to the test signal-to-noise ratio.

6. The method as recited in claim 1, further comprising determining that the test de-interlacer produces acceptable quality de-interlaced content if the test signal-to-noise ratio is within limits defined by the threshold.

7. The method as recited in claim 1, the threshold further comprising an absolute value of three (3) decibels.

8. The method as recited in claim 1, the threshold further comprising a value of ninety-five percent (95%).

9. A system, comprising:
   a processor;
   a reference filter configured to receive source video content and process the source video content to produce filtered content;
   an interlacer configured to process the source video content to produce interlaced content;
   a reference de-interlacer configured to process the interlaced content to produce reference de-interlaced content;
   a test de-interlacer configured to process the interlace content to produce test de-interlaced content; and
   an evaluation module configured to compare the test de-interlaced content to the reference interlaced content to determine if the test-interlaced content is of an acceptable quality.

10. The system as recited in claim 9, the evaluation module further configured to:
    derive a reference signal-to-noise ratio for the test de-interlaced content relative to the filtered content;
    derive a reference signal-to-noise ratio for the reference de-interlaced content relative to the filtered content; and
    compare the test signal-to-noise ratio to the reference signal-to-noise ratio.

11. The system as recited in claim 10, the evaluation module further configured to determine whether the test de-interlaced content is of acceptable quality as a result of the comparison of the test signal-to-noise ratio with the reference signal-to-noise ratio.

12. The system as recited in claim 11, the evaluation module further configured to determine that the test de-interlaced content is of an acceptable quality if a difference between the test signal-to-noise ratio and the reference signal-to-noise ratio is less than or equal to three (3) decibels.

13. The system as recited in claim 11, the evaluation module further configured to determine that the test de-interlaced content is of an acceptable quality if the test signal-to-noise ratio is at least ninety-five percent (95%) of the reference signal-to-noise ratio.

14. The system as recited in claim 9, the interlacer being further configured to:
    partially interlace the source video content to produce a single frame of reference interlaced content; and
    replace data missing from the single frame of reference interlaced content with corresponding original data from the source video content.

15. The system as recited in claim 14, the partial interlacing further comprising at least a step of an interlacing method utilized by the interlacer.

16. One or more computer-readable media containing computer-executable instructions that, when executed on a computer, perform the following steps:
    calculating a test signal-to-noise ratio between test de-interlaced content and reference content;
    calculating a reference signal-to-noise ratio between reference de-interlaced content and the reference content, and;
    comparing the test signal-to-noise ratio to the reference signal-to-noise ratio to determine if the test de-interlaced content meets a predefined quality standard.

17. The one or more computer-readable media as recited in claim 16, wherein:
    the test de-interlaced content is derived by processing interlaced content with a test de-interlacer; and
    the reference de-interlaced content is derived by processing the interlaced content with a reference de-interlacer.

18. The one or more computer-readable media as recited in claim 16, wherein:
    the test de-interlaced content and the reference de-interlaced content are produced by de-interlacing similar interlaced content using an interlacing method; and
    the reference content further comprises a frame of content processed with the interlacing method combined with a portion of the source video content.

19. The one or more computer-readable media as recited in claim 16, wherein the predefined quality standard further comprises a difference between the test signal-to-noise ratio and the reference signal-to-noise ratio being three (3) decibels or less.

20. The one or more computer-readable media as recited in claim 16, wherein the predefined quality standard further comprises the test signal-to-noise ratio comprising a value of at least ninety-five percent (95%) of the reference signal-to-noise ratio.

21. A method, comprising:
   de-interlacing interlaced content with a test de-interlacer to derive test de-interlaced content, the interlaced content being derived from source content;
   deriving an test error measurement between the test de-interlaced content and source content;
   deriving a reference error measurement between reference de-interlaced content and the source content; and
   comparing the test error measurement and the reference error measurement to determine a level of quality of the test de-interlaced content.

22. The method as recited in claim 21, further comprising de-interlacing the interlaced content with a reference de-interlacer to derive the reference de-interlaced content.

23. The method as recited in claim 21, wherein the comparing further comprises comparing the test error measurement and the reference error measurement against a predefined threshold.

24. The method as recited in claim 21, wherein the source content further comprises filtered source content, the filtered source content being derived from filtering the source content with a reference filter that utilizes a technique similar to an interlacing technique that was used to derive the interlaced content.

25. The method as recited in claim 21, wherein the error measurement is a technique chosen from one of the following error measurement techniques: signal-to-noise ratio; peak signal-to-noise ratio; mean square error, sum of absolute differences, sum of squared error, mean absolute difference, rth power distortion.

* * * * *